United States Patent [19]

Prince

[11] 3,710,606
[45] Jan. 16, 1973

[54] LOCKING DEVICE FOR CAR STICK SHIFT

[76] Inventor: Ernest A. Prince, 231 Wood Street, Rutherford, N.J. 07070

[22] Filed: Aug. 12, 1971

[21] Appl. No.: 171,171

[52] U.S. Cl..................70/203, 70/247, 70/DIG. 58, 150/52 K
[51] Int. Cl..........................B60r 25/06, G05g 5/00
[58] Field of Search..........70/232, 247, 14, 201, 202, 70/203, 416, 207, 204, DIG. 56, DIG. 58, 180, 158; 292/DIG. 2; 215/98, 9

[56] References Cited

UNITED STATES PATENTS 1,244,790  10/1917  Stevenson........................70/DIG. 56
3,583,184  6/1971  Papale..................................70/193

Primary Examiner—Marvin A. Champion
Assistant Examiner—William F. Pate, III
Attorney—John J. McGlew et al.

[57] ABSTRACT

A device for locking a hand operated shift which has a movable shift stick of a type which is located on a central panel in the driver's compartment between the two seats includes a cylinder member which fits over the handle portion of the stick shift at a location to enclose a movable release button. The release button must be depressed in order to move the stick shift from one gear position to another. The locking device includes an opening or slot in the tubular member which covers the handle part and it extends on the other side of the stick. It includes top portions bounding the slot with a lock shank receiving opening so that the lock shank may block the slot to keep the locking cylinder from being dislodged from a position blocking the movement of the release button.

3 Claims, 4 Drawing Figures

PATENTED JAN 16 1973 3,710,606

INVENTOR.
ERNEST A. PRINCE
BY
John J. McGlew
ATTORNEY

LOCKING DEVICE FOR CAR STICK SHIFT

BACKGROUND OF THE INVENTION

1. FIELD OF THE INVENTION:

This invention relates in general to the locking devices, and in particular, to a new and useful locking cylinder which is adapted to fit over a cross handle member of a stick shift and to be secured in position by a pad lock in order to prevent driving by preventing operation of a stick shift.

2. DESCRIPTION OF THE PRIOR ART:

At the present time many types of car locking devices are known, most of which require fixed lock installations such as they key lock which is built into the steering wheel. One effective way of preventing operation of the car is to prevent the shifting of the car so that it can be moved. The known locking devices are not satisfactory because they are too expensive and difficult to install.

SUMMARY OF THE INVENTION

In accordance with the present invention there is provided a locking device for a stick shift which has a handle extending across the upper end of a rod shift member or stick with a push release button which comprises a tube which fits over the handle and covers the release button so that it cannot be operated and which includes an end portion which bears against the central stick and a portion extending beyond the other side of the stick which has receiving openings for a padlock. The padlock bridges the leg portions of the cylinder and prevents the withdrawal of the device from the handle. The device protects the release button so that it cannot be operated so that the shift cannot be moved.

Accordingly, it is an object of the invention to provide a device for locking a stick shift which has a stick or rod portion with a handle extending transversely to the rod portion at the top thereof and which includes a tubular member which extends over the release button end of the handle and an opposite end which extends beyond the stick stick with separated leg portions which are bridged by a padlock to lock the handle so that the release cannot be operated.

A further object of the invention is to provide a device for preventing operation of an automobile which is simple in design, rugged in construction and economical to manufacture.

The various features of novelty which characterize the invention are pointed out with particularly in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

GENERAL DESCRIPTION OF THE PREFERRED EMBODIMENT

Figure 1:
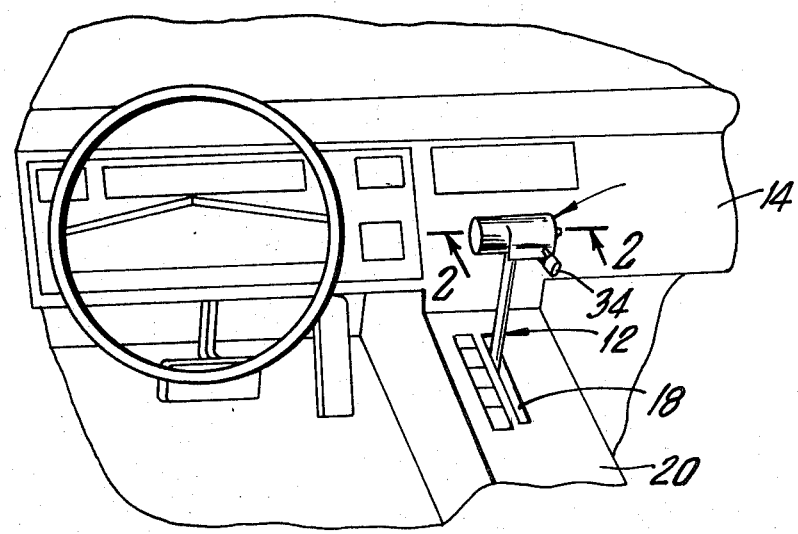
FIG. 1 is a partial perspective view of the interior of a driver's compartment of an automobile with a locking device constructed in accordance with the invention positioned on the stick shift.
Figure 2:
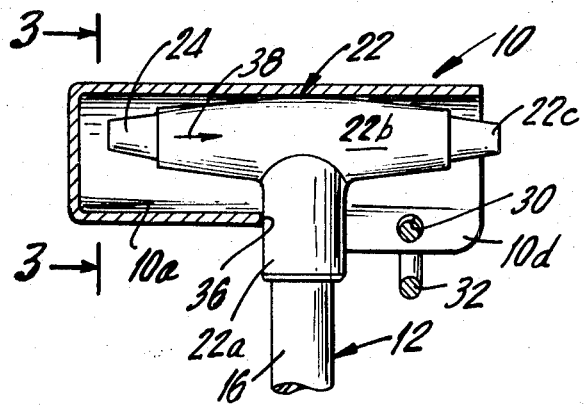
FIG. 2 is an enlarged section taken along the line 2—2 of FIG. 1.
Figure 3:
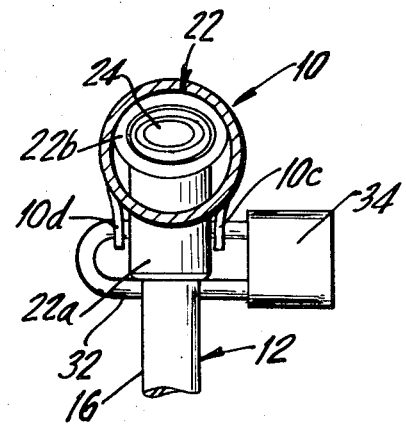
FIG. 3 is a section taken along line 3—3 of FIG. 2.
Figure 4:
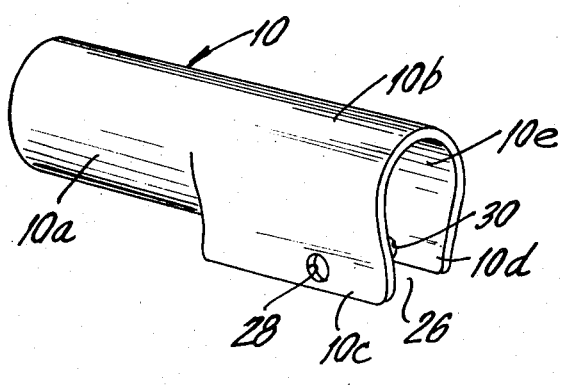
FIG. 4 is a side perspective view of the locking device.

Referring to the drawings in particular, the invention embodied therein, comprises a locking device generally designated 10 for use on a stick shift generally designated 12 of an automobile 14. The stick shift 12 includes a stick or rod portion 16 which extends upwardly from a slot 18 of a central panel 20 located between the seats of a driver's compartment of an automobile 14. A handle member generally designated 22 has a hub portion 22a which is threaded over the top of the rod portion 16 and a traversely extending portion 22b having one end in which is movable an operating button or release button 24. The opposite end includes a rigid stylized portion 22c which forms part of the handle.

In accordance with the invention, the locking device 10 comprises a closed tubular forward part 10a and a trailing or rear part 10b which has an opening or slot 26. The slot 26 is bounded by leg portions 10c and 10d which are extended downwardly and which include an opening 28 and 30 respectively which are aligned to receive a locking shank 32 of a padlock generally designated 34.

The locking device 10 is advantageously installed when the stick shift 12 is set at a "park" position. The locking device 10 is applied over the handle 22 with the push button being directed through the open end 10d of the locking tube and the solid tube portion 10a arranged to surround the handle part 22b and cover the release button 24. The inner edge 36 of the locking tube 10 abuts against the hub portion 22a of the handle. The hub portion 22a passes through the slot 26 until it abuts against edge 36 of the tubular part 10a. Since it is not possible to move the tubular locking member 10 inwardly any further, the release button 24 cannot be compressed, that is, moved inwardly in the direction of the arrow 38.

The padlock 34 is arranged so that its shank portion 32 extends through the slots 28 and 30 to prevent the withdrawal of the stick handle backwardly through the slot 26.

While a specific embodiment of the invention has been shown and described in detail to illustrate the application of the principles of the invention, it will be understood that the invention may be embodied otherwise without departing from such principles.

What is claimed is:

1. A locking device for a stick shift which has a central rod portion and a handle at its top which extends to each side of said rod portion and includes a release button on one side, comprising a tubular member including a closed tubular end adapted to be engaged over the handle of the stick-shift and extend up to the rod portion of the shift and an open tubular end having a slot for the passage of the handle and the stick rod therethrough and forming a side leg on each side of said handle with an opening therethrough for receiving a cross shank of a lock for preventing the removal of the handle through the slot.

2. A device, according to claim 1, wherein said tubular member is cylindrical and has a bottom portion with said slot extending therethrough bounded by one said side leg on each side of the slot which depends downwardly from said tubular member.

3. A device, according to claim 1, wherein said tubular member is circularly cylindrical with the closed end thereof being flat, said tubular member defining an edge at the inner end of said slot which abuts against the stick rod and prevents further inward movement of said tubular member in respect to the release button on the handle.

* * * * *